US012736406B2

(12) United States Patent
Isobe et al.

(10) Patent No.: US 12,736,406 B2
(45) Date of Patent: Sep. 15, 2026

(54) CARRYING CASE AND COLORIMETRIC SYSTEM

(71) Applicant: SEIKO EPSON CORPORATION, Tokyo (JP)

(72) Inventors: Shigeaki Isobe, Matsumoto (JP); Ko Terao, Shiojiri (JP); Yoshiki Kinoshita, Suwa (JP)

(73) Assignee: SEIKO EPSON CORPORATION, Tokyo (JP)

( * ) Notice: Subject to any disclaimer, the term of this patent is extended or adjusted under 35 U.S.C. 154(b) by 89 days.

(21) Appl. No.: 18/678,067

(22) Filed: May 30, 2024

(65) Prior Publication Data

US 2024/0402015 A1 Dec. 5, 2024

(30) Foreign Application Priority Data

May 31, 2023 (JP) ................................ 2023-089633

(51) Int. Cl.
*G01J 3/52* (2006.01)
*A45C 11/00* (2006.01)
*A45C 13/02* (2006.01)

(52) U.S. Cl.
CPC ................ *G01J 3/52* (2013.01); *A45C 11/00* (2013.01); *A45C 13/02* (2013.01)

(58) Field of Classification Search
CPC .......... G01J 3/52; G01J 3/0202; G01J 3/0291; G01J 3/46; A45C 11/00; A45C 13/02; A45C 5/03; A45C 13/001
See application file for complete search history.

(56) References Cited

U.S. PATENT DOCUMENTS

2002/0054292 A1* 5/2002 Orelli ................ G01N 21/5907 356/402
2013/0027721 A1* 1/2013 Kobayashi ........... H04N 1/6086 358/1.9

FOREIGN PATENT DOCUMENTS

JP 2003014546 A 1/2003

* cited by examiner

*Primary Examiner* — Monica T Taba
(74) *Attorney, Agent, or Firm* — CHIP LAW GROUP

(57) ABSTRACT

A carrying case configured to house a colorimetric scanning device that scans a color measurement target placed on a scanning stage includes: a case body that faces a bottom portion of the colorimetric scanning device; and a lid portion that is coupled to the case body and configured to be switched between a state of covering the colorimetric scanning device and an open state, in which the lid portion has a first region and a second region, the first region covering the thickest portion of the colorimetric scanning device, and the second region extending downward from the first region toward a portion thinner than the thickest portion.

20 Claims, 13 Drawing Sheets

CARRYING CASE AND COLORIMETRIC SYSTEM

The present application is based on, and claims priority from JP Application Serial Number 2023-089633, filed May 31, 2023, the disclosure of which is hereby incorporated by reference herein in its entirety.

BACKGROUND

1. Technical Field

The present disclosure relates to a carrying case for carrying a colorimetric scanning device, and a colorimetric system.

2. Related Art

As disclosed in JP-A-2003-014546, hitherto, a scanning colorimetric device has been proposed that scans a color chart in which a plurality of color patches are arranged in a matrix and sequentially measures colors of the color patches. The scanning colorimetric device described in JP-A-2003-014546 includes a sample stage on which the color chart is mounted, and a colorimetric head that measures the colors of the color chart mounted on the sample stage. The colorimetric head moves in an X direction by receiving power from a motor. The sample for measurement is fed in a Y direction by a chart feeding mechanism provided on the sample stage. The measurement of the colors of the color patches arranged in a matrix is performed by moving the colorimetric head in the X direction and moving the color chart in the Y direction.

The scanning colorimetric device as described above has a shape that is difficult to carry, and it is desirable to prepare a dedicated carrying case in consideration of portability. Dedicated carrying cases are sometimes prepared for carrying cameras and other electronic devices. Here, the above-described scanning colorimetric device includes the sample stage and thus has a large overall size. Accordingly, a carrying case therefor tends to be large. When the carrying case has a large size, other articles may be placed on the top of the carrying case that is in a laid-down position, or a plurality of carrying cases may be stacked, and as a result, an excessive load may be applied to the scanning colorimetric device inside the carrying case, which can easily lead to damage or failure.

SUMMARY

According to an aspect of the present disclosure, a carrying case configured to house a colorimetric scanning device that scans a color measurement target placed on a scanning stage on which a colorimetric device is mounted includes: a case body that faces a bottom portion of the colorimetric scanning device; and a lid portion that is coupled to the case body and configured to be switched between a state of covering the colorimetric scanning device and an open state, in which the lid portion has a first region and a second region, the first region covering the thickest portion of the colorimetric scanning device, and the second region extending downward from the first region toward a portion thinner than the thickest portion.

According to an aspect of the present disclosure, a colorimetric system includes: a colorimetric scanning device that scans a color measurement target placed on a scanning stage; a colorimetric device that is provided in the colorimetric scanning device; and a carrying case that is configured to house the colorimetric scanning device, in which the carrying case includes a case body that faces a bottom portion of the colorimetric scanning device, and a lid portion that is configured to be switched between a state of covering the colorimetric scanning device and an open state, and the lid portion has a first region and a second region, the first region covering the thickest portion of the colorimetric scanning device, and the second region extending downward from the first region toward a portion thinner than the thickest portion.

BRIEF DESCRIPTION OF THE DRAWINGS

FIG. 12 is an enlarged view of the inside of a fastener.

FIG. 13 is a front view of a connector coupling portion provided in a side surface of the colorimetric scanning device.

DESCRIPTION OF EMBODIMENTS

Figure 1:
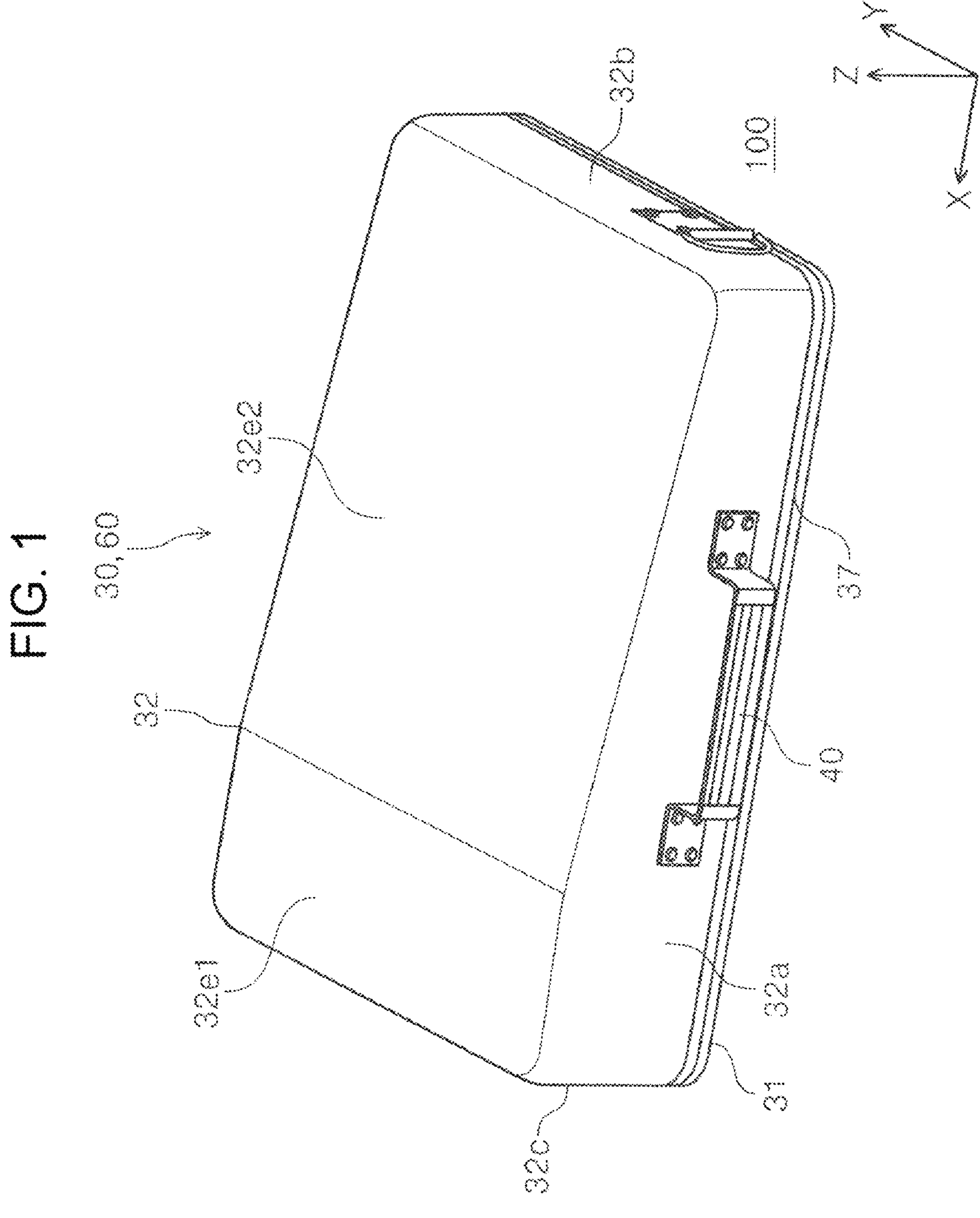
FIG. 1 is a perspective view of a carrying case viewed from the front.

Hereinafter, the present disclosure will be schematically described. A carrying case according to a first aspect is a carrying case configured to house a colorimetric scanning device that scans a color measurement target placed on a scanning stage on which a colorimetric device is mounted, the carrying case including: a case body that faces a bottom portion of the colorimetric scanning device; and a lid portion that is coupled to the case body and configured to be switched between a state of covering the colorimetric scanning device and an open state, in which the lid portion has a first region and a second region, the first region covering the thickest portion of the colorimetric scanning device, and the second region extending downward from the first region toward a portion thinner than the thickest portion.

According to the present aspect, the lid portion has the first region that covers the thickest portion of the colorimetric scanning device, and the second region that extends downward from the first region toward the portion thinner than the thickest portion. As the second region is provided, it is possible to suppress other articles from being placed on the carrying case that is in a laid-down position or to suppress a plurality of carrying cases from being stacked. As a result, it is possible to suppress damage or failure caused by an excessive load applied to the colorimetric scanning device inside the carrying case. The thickest portion of the colorimetric scanning device is a portion of the colorimetric scanning device that has the largest dimension in a normal direction with respect to the scanning stage.

According to a second aspect dependent on the first aspect, the thickest portion of the colorimetric scanning device is a scanning portion configured to move with respect to the scanning stage in a first direction and a second direction intersecting the first direction, and the first region of the lid portion covers the scanning portion.

According to the present aspect, in a case where the thickest portion of the colorimetric scanning device is a scanning portion that is movable with respect to the scanning stage in the first direction and the second direction intersecting the first direction, the scanning portion easily fails when an external load is applied to the scanning portion. However, the failure of the scanning portion can be suppressed due to the effects of the first aspect described above. In addition, the second region of the lid portion can suppress the scanning portion from significantly moving within the carrying case. Also from this point of view, the second region can suppress the failure of the scanning portion.

According to a third aspect dependent on the second aspect, the scanning portion is provided on a gantry that has a shape extending in the first direction and is configured to move in the second direction, and the first region extends in the first direction in such a way as to cover an upper portion of the gantry.

According to the present aspect, the scanning portion is provided on the gantry that has a shape extending in the first direction and is movable in the second direction, and the first region extends in the first direction in such a way as to cover an upper portion of the gantry. Therefore, the entire gantry can be protected by the first region.

According to a fourth aspect dependent on the third aspect, the first region is positioned at one end portion of the lid portion in the second direction, and the second region extends linearly downward from the first region to the other end portion of the lid portion in the second direction.

According to the present aspect, the first region is positioned at one end portion of the lid portion in the second direction, and the second region extends linearly downward from the first region to the other end portion of the lid portion in the second direction. Therefore, the second region for suppressing other articles from being placed on the carrying case that is in a laid-down position or suppressing a plurality of carrying cases from being stacked has a large size. As a result, it is possible to effectively suppress other articles from being placed on the carrying case that is in a laid-down position or suppress a plurality of carrying cases from being stacked.

According to a fifth aspect dependent on the third aspect, the first region is positioned at one end portion of the lid portion in the second direction, the lid portion has a third region that is parallel to the scanning stage and is positioned at the other end portion of the lid portion in the second direction, and the second region is positioned between the first region and the third region in the second direction.

According to the present aspect, the first region is positioned at one end portion of the lid portion in the second direction, the lid portion has the third region that is parallel to the scanning stage and is positioned at the other end portion of the lid portion in the second direction, and the second region is positioned between the first region and the third region in the second direction. Therefore, it is possible to downsize the entire carrying case.

According to a sixth aspect dependent on the second aspect, a grip portion for gripping the carrying case in a state in which the first direction is aligned with a vertical direction is provided on one side surface of the lid portion in the first direction among side surfaces forming a periphery of the lid portion.

According to the present aspect, the grip portion for gripping the carrying case in a state in which the first direction is aligned with the vertical direction is provided on one side surface of the lid portion in the first direction among the side surfaces forming the periphery of the lid portion. Therefore, portability of the carrying case is improved. The present aspect is not limited to the second aspect and may be dependent on the first aspect or any one of the third to fifth aspects.

According to a seventh aspect dependent on the second aspect, the carrying case further includes a movement regulating body that regulates movement of the scanning portion in at least one of the first direction or the second direction in a state in which the colorimetric scanning device is housed in the carrying case, in which the movement regulating body is disposed in such a way as to utilize a movement region of the scanning portion.

According to the present aspect, the carrying case further includes the movement regulating body that regulates movement of the scanning portion in at least one of the first direction or the second direction in a state in which the colorimetric scanning device is housed in the carrying case. Therefore, it is possible to suppress the scanning portion from moving unintentionally within the carrying case when the colorimetric scanning device is housed in the carrying case and carried. As a result, damage to the scanning portion or the like can be suppressed. The present aspect is not limited to the second aspect and may be dependent on any one of the third to fifth aspects.

According to an eighth aspect dependent on the seventh aspect, the carrying case further includes a grip portion for gripping the carrying case in a state in which the first direction is aligned with a vertical direction, in which the movement regulating body has a shape that avoids the scanning portion in a state in which the scanning portion is positioned at a vertically downward travel limit when the grip portion is gripped.

According to the present aspect, the carrying case further includes the grip portion for gripping the carrying case in a state in which the first direction is aligned with the vertical direction, and the movement regulating body has a shape that avoids the scanning portion in a state in which the scanning portion is positioned at the vertically downward travel limit. Therefore, when the carrying case is carried by gripping the grip portion, the scanning portion is positioned at the vertically downward travel limit, so that the position of the scanning portion in the vertical direction can be easily stabilized.

According to a ninth aspect dependent on the seventh aspect, the movement regulating body includes a recessed portion configured to house an article. According to the present aspect, the movement regulating body includes the recessed portion configured to house an article. Therefore, convenience in using the carrying case is improved. The present aspect is not limited to the seventh aspect and may be dependent on the eighth aspect.

According to a tenth aspect dependent on the first aspect, the lid portion is attachable to and detachable from the case body. According to the present aspect, the lid portion is attachable to and detachable from the case body. Therefore, the lid portion is less obstructive when using the colorimetric scanning device, thereby improving usability of the colorimetric scanning device. The present aspect is not limited to the first aspect and may be dependent on any one of the second to ninth aspects.

According to an eleventh aspect dependent on the first aspect, the carrying case further includes a fastener that couples the case body and the lid portion, in which the fastener is provided at a position lower than a stage surface of the scanning stage in a vertical direction when the case body is mounted on a mounting surface.

According to the present aspect, the carrying case further includes the fastener that couples the case body and the lid portion, and the fastener is provided at a position lower than the stage surface of the scanning stage in the vertical direction when the case body is mounted on the mounting surface of the carrying case. Therefore, the fastener is less likely to interfere with the color measurement target when placing the color measurement target on the stage surface of the scanning stage. The present aspect is not limited to the first aspect and may be dependent on any one of the second to tenth aspects.

According to a twelfth aspect dependent on the first aspect, the carrying case further includes a fastener that couples the case body and the lid portion, in which the fastener is provided at a position that does not cover a connector coupling portion provided on a side surface of the colorimetric scanning device.

According to the present aspect, the carrying case further includes the fastener that couples the case body and the lid portion, and the fastener is provided at a position that does not cover the connector coupling portion provided on the side surface of the colorimetric scanning device. Therefore, interference between the fastener and a connector coupled to the connector coupling portion or a cable to which the connector is attached can be suppressed. The present aspect is not limited to the first aspect and may be dependent on any one of the second to eleventh aspects.

According to a thirteenth aspect of the present disclosure, a colorimetric system includes: a colorimetric scanning device that scans a color measurement target placed on a scanning stage on which a colorimetric device is mounted; the colorimetric device that is provided in the colorimetric scanning device; and a carrying case that is configured to house the colorimetric scanning device, in which the carrying case includes a case body that faces a bottom portion of the colorimetric scanning device, and a lid portion that is configured to be switched between a state of covering the colorimetric scanning device and an open state, and the lid portion has a first region and a second region, the first region covering the thickest portion of the colorimetric scanning device, and the second region extending downward from the first region toward a portion thinner than the thickest portion.

According to the present aspect, the lid portion has the first region that covers the thickest portion of the colorimetric scanning device, and the second region that extends downward from the first region toward the portion thinner than the thickest portion. As the second region is provided, it is possible to suppress other articles from being placed on the carrying case that is in a laid-down position or to suppress a plurality of carrying cases from being stacked. As a result, it is possible to suppress damage or failure caused by an excessive load applied to the colorimetric scanning device inside the carrying case.

Hereinafter, the present disclosure will be described in detail. In FIGS. 1, 3, 4, and 6, Reference Numeral 100 denotes a device mounting surface on which a colorimetric scanning device 1 is mounted when using the colorimetric scanning device 1 described below, and for example, the device mounting surface is a horizontal planar surface. Furthermore, in an X-Y-Z coordinate system illustrated in each drawing, a Z-axis direction is a direction along a vertical direction when the colorimetric scanning device 1 is mounted on the device mounting surface 100. In the Z-axis direction, a +Z direction is a vertically upward direction, and a-Z direction is a vertically downward direction. Hereinafter, configurations of the colorimetric scanning device 1, a colorimetric device 50, and a carrying case 30 may be described using the X-Y-Z coordinate system.

Figure 2:
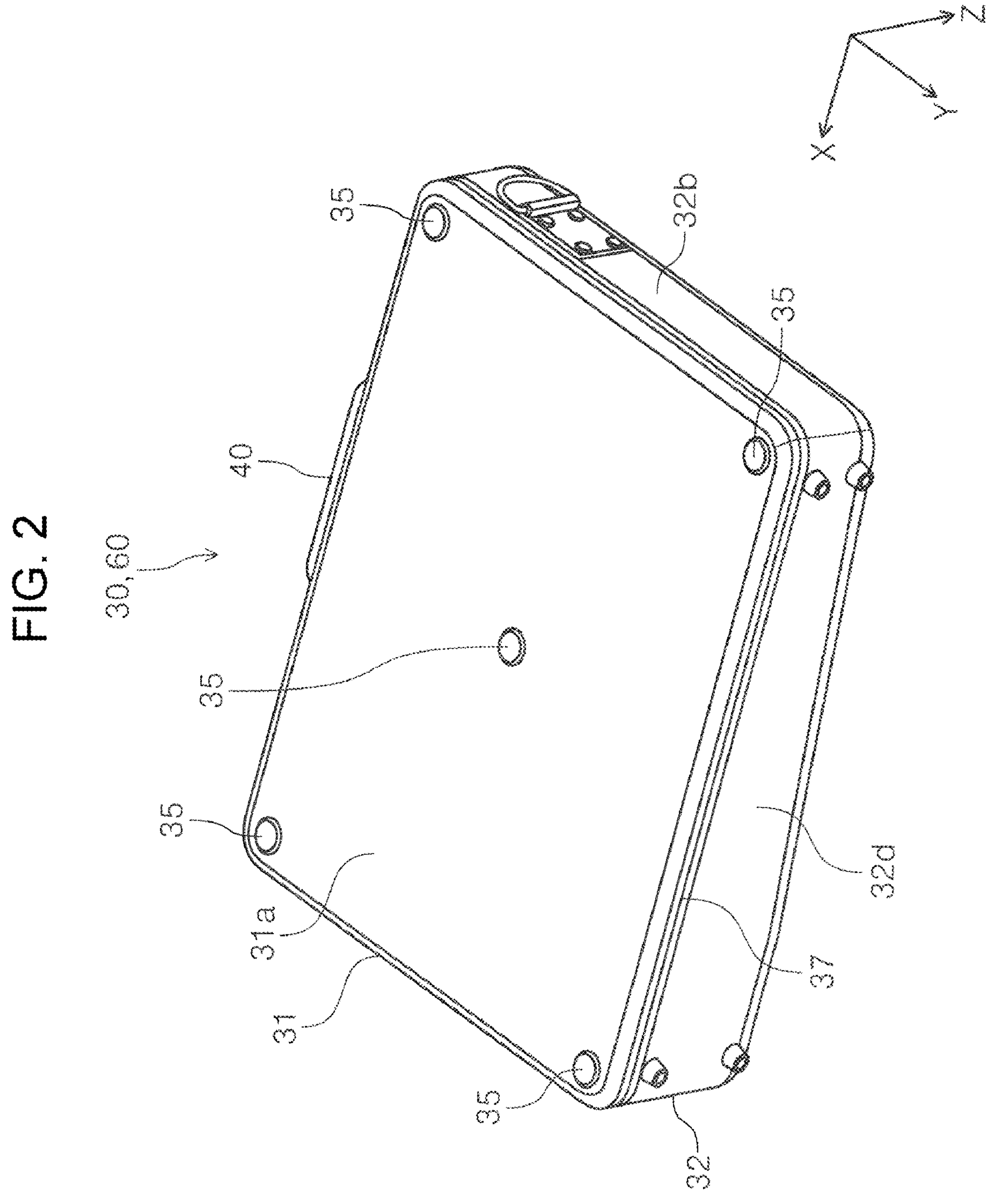
FIG. 2 is a perspective view of the carrying case viewed from the back.
Figure 3:
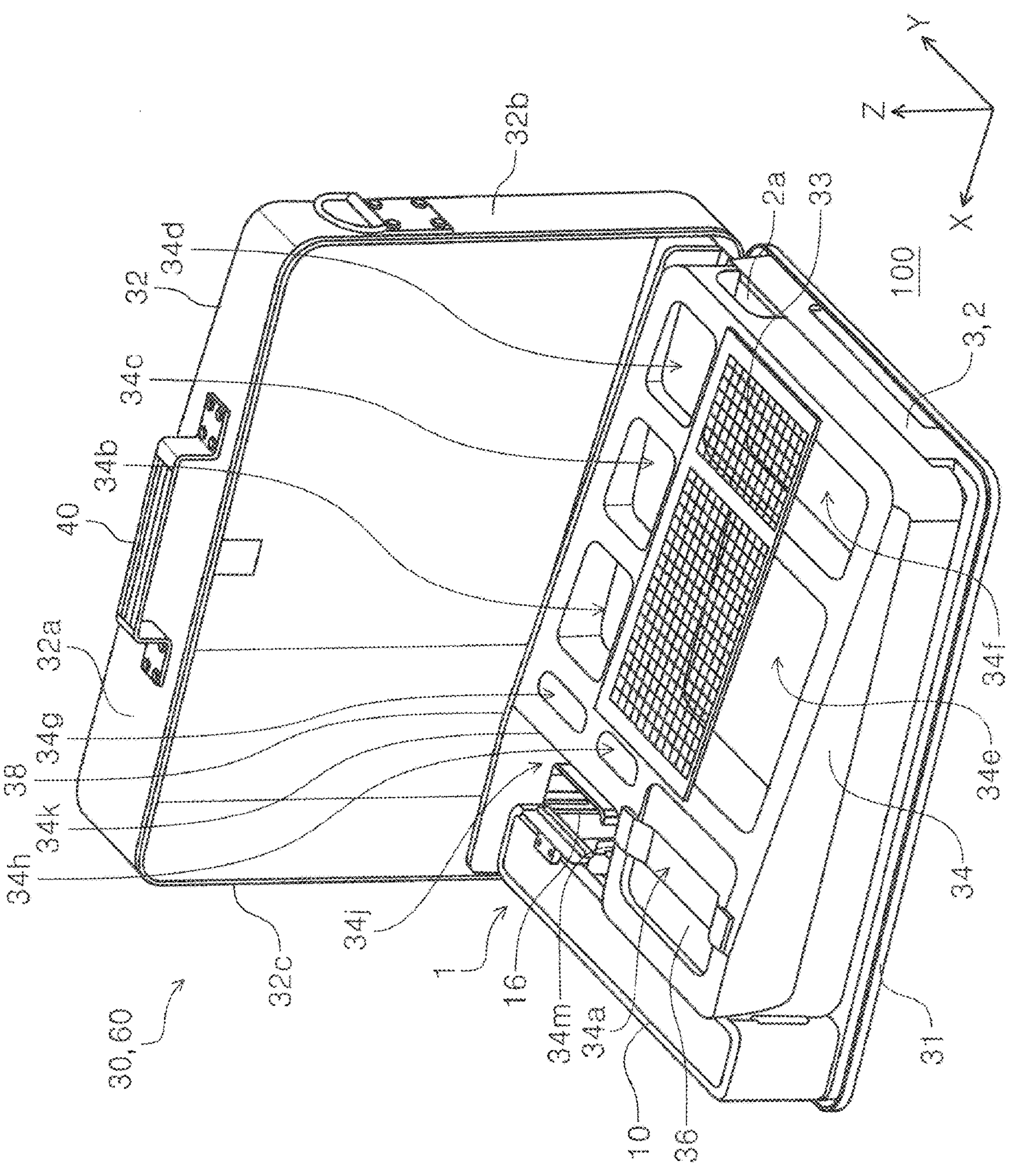
FIG. 3 is a perspective view of the carrying case with a lid portion open.

In FIGS. 1 to 3, the colorimetric scanning device 1 is housed in the carrying case 30. The carrying case 30 is a dedicated case designed to house and carry the colorimetric scanning device 1. The colorimetric scanning device 1, the carrying case 30, and the colorimetric device 50 (see FIG. 7) are included in a colorimetric system 60.

The carrying case 30 includes a case body 31 that faces a lower stage member 4 (see FIG. 9) that forms a bottom portion of the colorimetric scanning device 1, and a lid portion 32 that can be switched between a state of covering the colorimetric scanning device 1 and an open state. In the present embodiment, the case body 31 has a tray shape in which an outer periphery of a plate-shaped body plate 31*a* along an X-Y plane slightly rises in the +Z direction. The case body 31 is formed of a material with a certain degree of flexibility while maintaining its shape. For example, in the case body 31, a base such as a flexible resin plate can be provided inside, and a surface of the case body 31 can be formed of a material such as nylon, polyester, or cloth. Note that the lower stage member 4 forming the bottom portion of the colorimetric scanning device 1 is formed of a resin material and is thicker than the body plate 31*a* of the case body 31. Therefore, the body plate 31*a* of the case body 31 has lower rigidity than the lower stage member 4.

The lid portion 32 has a first side surface 32*a*, a second side surface 32*b*, a third side surface 32*c*, and a fourth side surface 32*d* and is formed in such a way as to cover the periphery of the colorimetric scanning device 1 when closed. The first side surface 32*a* and the fourth side surface 32*d* are surfaces parallel to an X-Z plane. The second side surface 32*b* and the third side surface 32*c* are surfaces parallel to a Y-Z plane. Further, the surface of the lid portion 32 has a first region 32*e*1 parallel to the X-Y plane, and a second region 32*e*2 that is inclined downward from the first region 32*e*1 in a-X direction.

As illustrated in FIG. 3, the lid portion 32 has a tray shape that is deeper than the case body 31 when viewed from the inside. The lid portion 32 is formed of a material with a certain degree of flexibility while maintaining its shape. For example, in the lid portion 32, a base such as a flexible resin plate can be provided inside, and a surface of the lid portion 32 can be formed of a material such as nylon, polyester, or cloth.

A grip portion 40 is provided on the first side surface 32*a* of the lid portion 32, and a user carrying the carrying case 30 can grip the grip portion 40, thereby improving the portability of the carrying case 30. When the user grips the grip portion 40, the first side surface 32*a* becomes an upper surface and the fourth side surface 32*d* becomes a lower surface.

Note that the grip portion 40 may be provided on another side surface of the lid portion 32, such as the second side surface 32*b*. In this case, when the user grips the grip portion 40, the second side surface 32*b* becomes the upper surface and the third side surface 32*c* becomes the lower surface.

Since the third side surface 32*c* is a side surface corresponding to a thick portion of the carrying case 30, the carrying case 30 can easily stand on its own when the carrying case 30 is placed with the third side surface 32*c* facing down. Further, since a gantry 10 is positioned on a lower side of the colorimetric scanning device 1, the center of gravity of the colorimetric scanning device 1 is positioned below, which makes it easier to stabilize the carrying case 30 when the carrying case 30 is placed with the third side surface 32*c* facing down. In addition, the carrying case 30 can be easily carried by the user by holding a-X-direction-side portion of the carrying case 30 that corresponds to a thin portion of the carrying case 30 under the armpit of the user.

The lid portion 32 is coupled to the case body 31 by a fastener 37. The fastener 37 is a zip fastener, for example, and is provided along the entire periphery of the side surfaces of the carrying case 30. As the fastener 37 is opened, the inside of the carrying case 30 can be exposed as illustrated in transition from FIG. 1 to FIG. 3. As the fastener 37 is further opened from this state to be fully opened, the lid portion 32 can be detached from the case body 31 as illustrated in transition from FIG. 3 to FIG. 4. Although not illustrated, an insertion pin (not illustrated), which is a coupling start position of the fastener 37, is provided in the fourth side surface 32*d* of the lid portion 32, and a box (not illustrated) into which the insertion pin (not illustrated) fits is provided at a position in the case body 31 coupled to the fourth side surface 32*d*.

Figure 5:
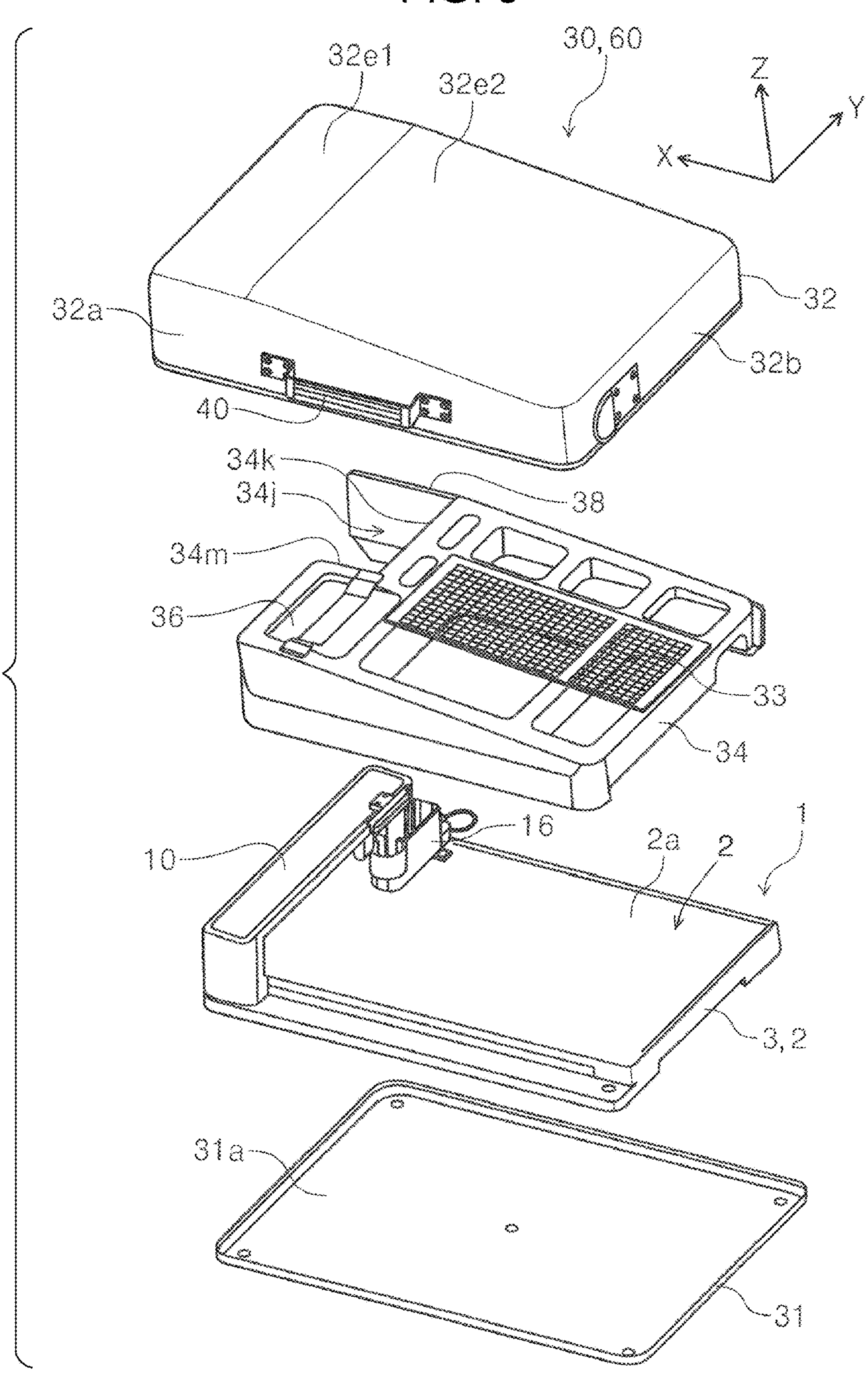
FIG. 5 is an exploded perspective view of the carrying case.

A back surface of the carrying case 30 that is opposite to the first region 32*e*1 and the second region 32*e*2 of the lid portion 32 is formed by the body plate 31*a* of the case body 31 (see FIG. 5). As illustrated in FIG. 2, the body plate 31*a* is provided with rubber legs 35, which are examples of leg portions, at four corners and the center of the body plate 31*a*. The rubber legs 35 slightly protrude in the −Z direction from the body plate 31*a* and come into contact with the device mounting surface 100. As the rubber legs 35 are provided, a posture of the colorimetric scanning device 1 can be stabilized even when some unevenness exists on the device mounting surface 100.

A coefficient of friction between the rubber legs 35 and the device mounting surface 100 is higher than a coefficient of friction between the body plate 31*a* and the device mounting surface 100. Therefore, with this configuration, the colorimetric scanning device 1 is less likely to slip on the device mounting surface 100 and can be used in a more stable condition as compared to a configuration in which the body plate 31*a* directly comes into contact the device mounting surface 100 without the rubber legs 35. In the present embodiment, the rubber legs 35 are provided at the four corners and the center of the body plate 31*a*, but the arrangement positions and the number of rubber legs 35 are not limited thereto, and can be changed as appropriate.

When the fastener 37 is opened and the lid portion 32 is opened, a movement regulating body 34 and a part of the colorimetric scanning device 1 are exposed as illustrated in FIG. 3. The movement regulating body 34 can be formed of an elastic material such as sponge, for example. As illustrated in FIG. 3, a first housing portion 34*a*, a second housing portion 34*b*, a third housing portion 34*c*, a fourth housing portion 34*d*, a fifth housing portion 34*e*, a sixth housing portion 34*f*, a seventh housing portion 34*g*, and an eighth housing portion 34*h* are provided in the movement regulating body 34. Each housing portion is a recessed portion and is capable of housing an article.

The first housing portion 34*a* can house, for example, the colorimetric device 50 described below. Therefore, a size, shape, and depth of the first housing portion 34*a* are designed to house the colorimetric device 50. Therefore, a large gap is not formed between the colorimetric device 50 and the lid portion 32, and the colorimetric device 50 does not protrude upward from the movement regulating body 34 when the colorimetric device 50 is housed in the first housing portion 34*a*. Note that a lid member 36 is provided in the first housing portion 34*a*, and the lid member 36 can cover the colorimetric device 50 housed in the first housing portion 34*a*. The other housing portions can house equipment such as cables used in the colorimetric scanning device 1, for example. As described above, the movement regulating body 34 includes a plurality of housing portions capable of housing articles. As a result, convenience in using the carrying case 30 is improved.

Note that a cover member 33 that covers a part of each of the fifth housing portion 34*e* and the sixth housing portion 34*f* is provided for the fifth housing portion 34*e* and the sixth housing portion 34*f*. Therefore, it is possible to particularly suppress articles housed in the fifth housing portion 34*e* and the sixth housing portion 34*f* from falling out when the carrying case 30 is carried by gripping the grip portion 40.

Figure 4:
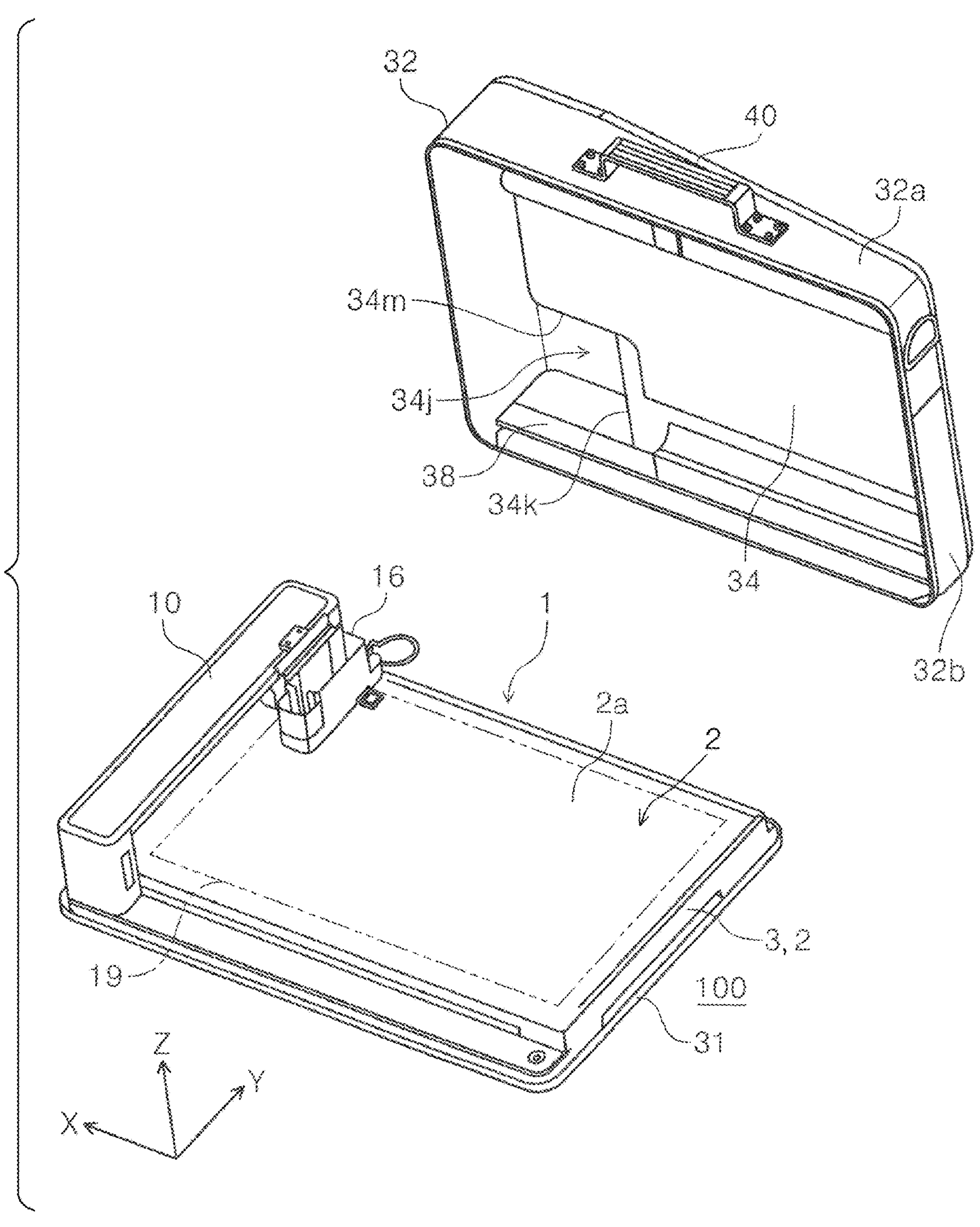
FIG. 4 is a perspective view of the carrying case with the lid portion detached from a case body.

The movement regulating body 34 is disposed on an upper portion of a scanning stage 2 in such a way as to utilize movement regions of the gantry 10 and a carriage 16 of the colorimetric scanning device 1 described below. A notch 34*j* is formed in the movement regulating body 34, and the carriage 16 is disposed inside the notch 34*j*. Further, the gantry 10 is disposed in a +X direction with respect to the movement regulating body 34. The movement regulating body 34 is provided integrally with the lid portion 32, and when the lid portion 32 is detached from the case body 31, the movement regulating body 34 is separated from the case body 31 together with the lid portion 32 as illustrated in FIG. 4.

Figure 6:
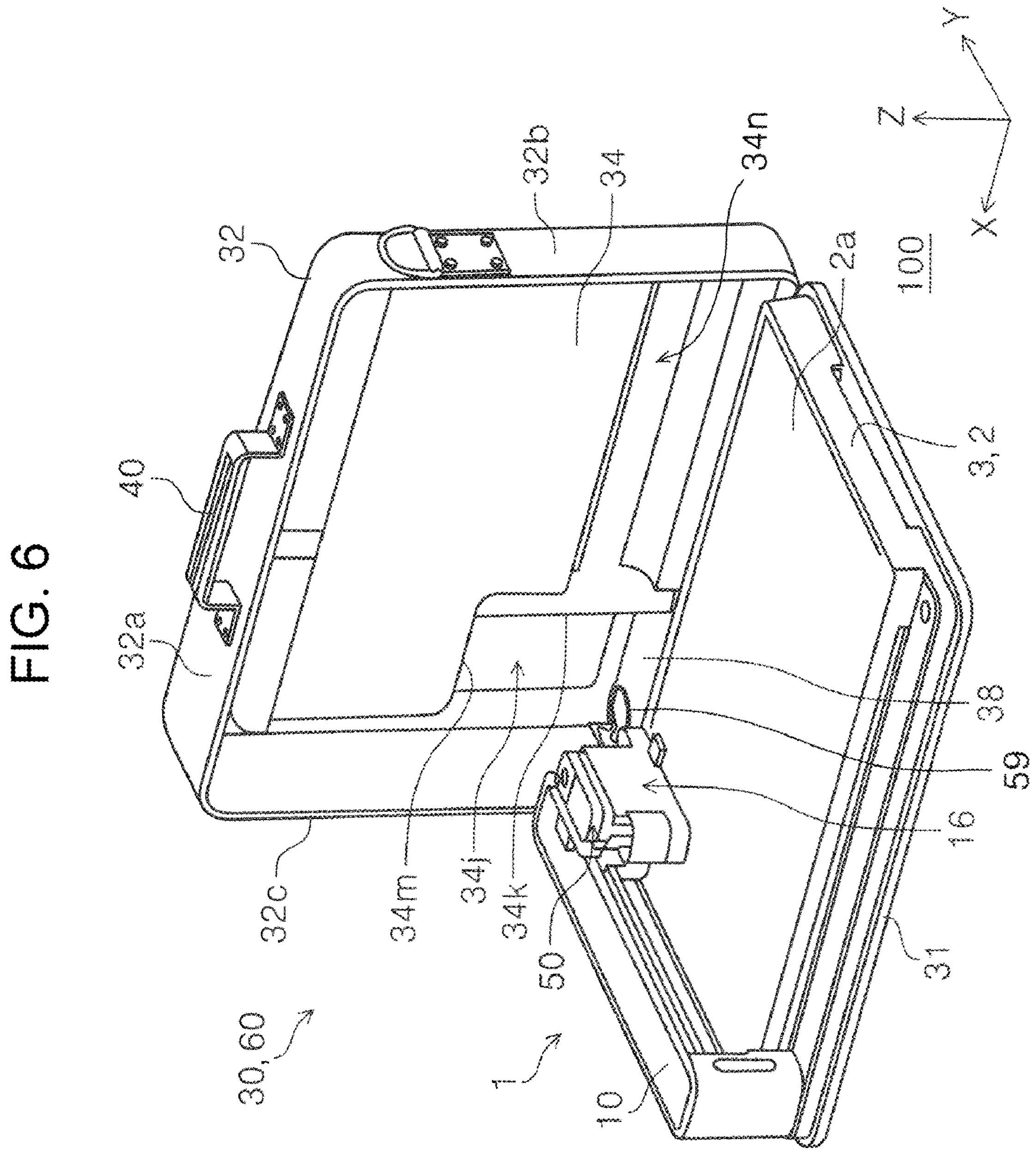
FIG. 6 is a perspective view of the carrying case with the lid portion and a movement regulating body open.

Further, the movement regulating body 34 can be opened and closed together with the lid portion 32, and when the lid portion 32 and the movement regulating body 34 are opened as illustrated in FIG. 6 without detaching the lid portion 32 from the case body 31, the colorimetric scanning device 1 can be mounted on the device mounting surface 100 and used without taking out the colorimetric scanning device 1. However, in the present embodiment, the lid portion 32 is attachable to and detachable from the case body 31. As the lid portion 32 is detached from the case body 31, the lid portion 32 and the movement regulating body 34 are less obstructive when using the colorimetric scanning device 1, thereby improving the usability of the colorimetric scanning device 1. However, it goes without saying that the lid portion 32 may have a structure that cannot be detached from the case body 31. Moreover, the movement regulating body 34 may be omitted.

As illustrated in FIG. 6, a recessed portion 34*n* is formed in the movement regulating body 34 in such a way as to extend in an X-axis direction. In FIG. 6, Reference Numeral 59 denotes a communication cable that couples the colorimetric device 50 and the colorimetric scanning device 1, and the communication cable 59 protrudes from the carriage 16 in a +Y direction. As the recessed portion 34*n* is formed, it is possible to prevent the communication cable 59 from interfering with the movement regulating body 34 when the communication cable 59 moves in the X-axis direction as the gantry 10 moves in the X-axis direction.

The rubber legs 35 may be fixable to the lower stage member 4 of the colorimetric scanning device 1 through the body plate 31*a* from the outside of the body plate 31*a*. By doing so, the colorimetric scanning device 1, the body plate

31*a*, and the rubber legs 35 are integrated. In this case, the rubber legs 35 can be fixed to the lower stage member 4 of the colorimetric scanning device 1 with screws. With this configuration, the colorimetric scanning device 1 becomes difficult to move with respect to the device mounting surface 100 due to friction between the device mounting surface 100 and the rubber legs 35. In addition, misalignment between the colorimetric scanning device 1 and the body plate 31*a* can be prevented, and the colorimetric scanning device 1 can be used more stably.

Next, the configuration of the colorimetric scanning device 1 will be schematically described with reference to FIGS. 4 and 8. The colorimetric scanning device 1 is a device in which the colorimetric device 50 (see FIG. 7) is set on the carriage 16, and a color chart 19, which is an example of a measurement target, on the scanning stage 2 is scanned by the carriage 16, that is, the colorimetric device 50, in a state in which the color chart 19 is mounted on a stage surface 2*a* of the scanning stage 2. As an example, the color chart 19 is formed by arranging a plurality of color patches (not illustrated) in a matrix. The plurality of color patches are assigned with different colors.

The stage surface 2*a* of the scanning stage 2 is a surface parallel to the X-Y plane. The scanning stage 2 includes an upper stage member 3 forming the stage surface 2*a*, and the lower stage member 4 positioned under the upper stage member 3 (see FIG. 9). The lower stage member 4 forms the bottom portion of the colorimetric scanning device 1.

The colorimetric scanning device 1 includes the gantry 10 that straddles the stage surface 2*a* of the scanning stage 2 in a Y-axis direction. The gantry 10 moves in the X-axis direction by receiving power of a gantry motor 22 illustrated in FIG. 9. More specifically, a front slider 26 is provided at a lower end portion of the gantry 10. The front slider 26 is movable in the X-axis direction. The front slider 26 is fixed to a part of an endless belt 25. The endless belt 25 is wound around a driving pulley 24 positioned at an end portion in the +X direction and a driven pulley (not illustrated) positioned at an end portion in the −X direction. A driving force is transmitted from the gantry motor 22 to the driving pulley 24. When the gantry motor 22 rotates, the endless belt 25 rotates, thereby moving the gantry 10 in the X-axis direction.

Figure 8:
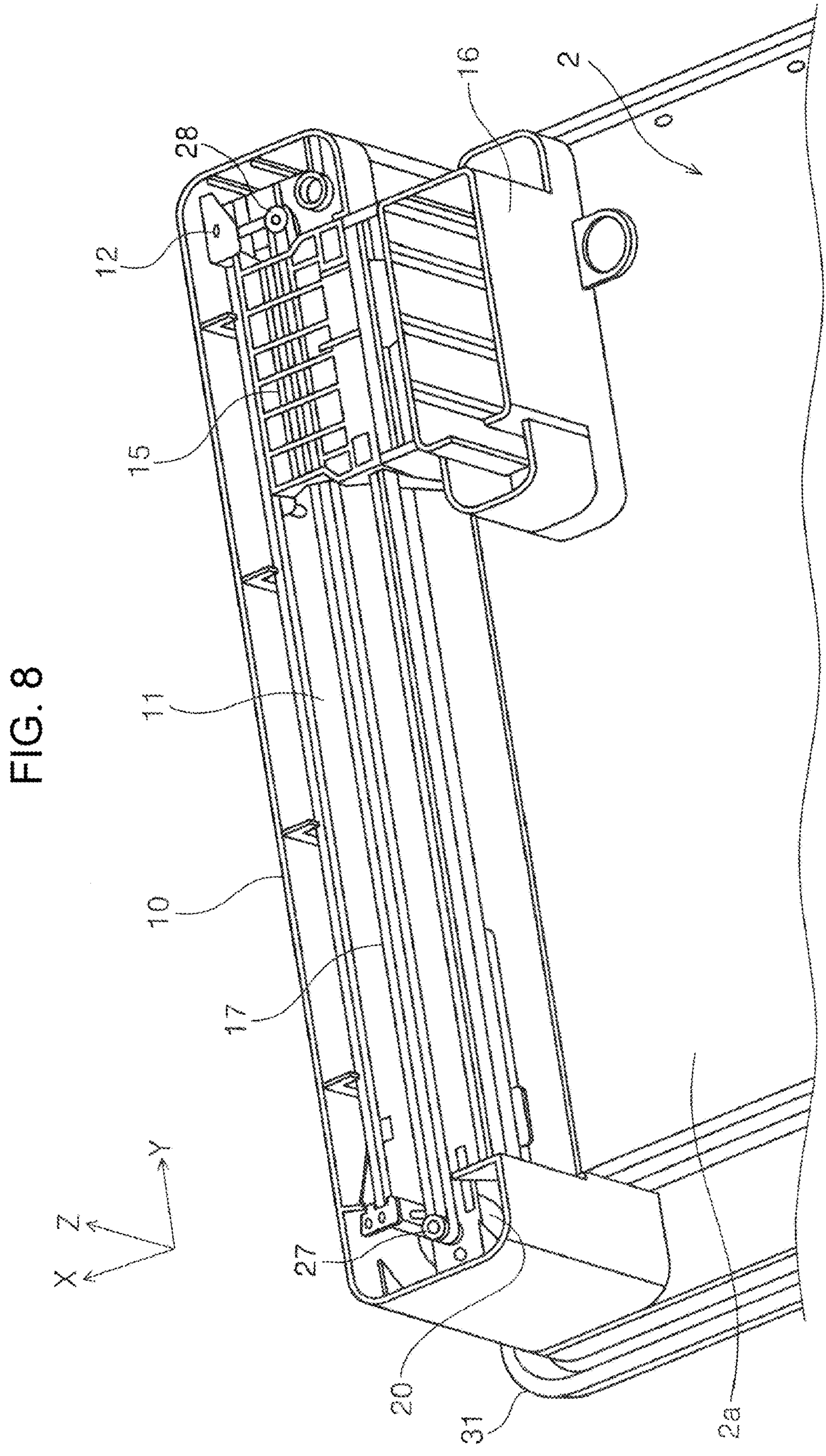
FIG. 8 is a perspective view illustrating an internal structure of a gantry.

Next, a carriage motor 20 is provided in the gantry 10 as illustrated in FIG. 8. A driving pulley 27 is provided on a motor shaft of the carriage motor 20. Further, a driven pulley 28 is provided at an end portion of the gantry 10 in the +Y direction. An endless belt 17 is wound around the driving pulley 27 and the driven pulley 28. A carriage slider 15 is fixed to a part of the endless belt 17. The carriage slider 15 is slidable in the Y-axis direction with respect to a frame 11 forming a base of the gantry 10. The carriage 16 is fixed to the carriage slider 15. Accordingly, when the carriage motor 20 rotates, the endless belt 17 rotates, thereby moving the carriage slider 15, that is, the carriage 16, moves in the Y-axis direction.

As the gantry 10 moves in the X-axis direction, and the carriage 16 moves in the Y-axis direction, the colorimetric device 50 (see FIG. 7) set on the carriage 16 can scan the color chart 19. Therefore, the carriage 16 is an example of a scanning portion that is movable in the Y-axis direction and the X-axis direction with respect to the scanning stage 2. The Y-axis direction is an example of a first direction, and the X-axis direction is an example of a second direction intersecting the first direction.

The carriage 16 is displaceable with respect to the gantry 10 in the Z-axis direction by receiving power from a motor (not illustrated). When setting the colorimetric device 50 on the carriage 16, the carriage 16 is positioned at an installation position (see FIG. 9) that is far away from the scanning stage 2 in the +Z direction.

Here, when the colorimetric scanning device 1 is housed in the carrying case 30 as described above, the movement regulating body 34 that regulates the movement of the carriage 16 in the X-axis direction and the Y-axis direction is disposed in such a way as to utilize the movement region of the carriage 16. Therefore, it is possible to suppress the carriage 16 from moving unintentionally within the carrying case 30 when the colorimetric scanning device 1 is housed in the carrying case 30 and carried. As a result, damage to the carriage 16 or the like can be suppressed. Note that a pad member 38 is provided in the +Y direction with respect to the movement regulating body 34 as illustrated in FIG. 3. The pad member 38 is formed of an elastic material. The pad member 38 is positioned below the gantry 10 and the carriage 16 when the carrying case 30 is carried by gripping the grip portion 40, and exerts a shock buffering effect on the gantry 10 and the carriage 16.

In the present embodiment, a home position of the carriage 16 is at a +X-direction travel limit in the X-axis direction and at a +Y-direction travel limit in the Y-axis direction. It is assumed that the carriage 16 is positioned at the home position when the colorimetric scanning device 1 is housed in the carrying case 30. When the colorimetric scanning device 1 is housed in the carrying case 30, a first regulating surface 34*k* of the movement regulating body 34 regulates the movement of the gantry 10, that is, the carriage 16, in the −X direction, and a second regulating surface 34*m* regulates the movement of the carriage 16 in the −Y direction. Thereby, the carriage 16 is held at the home position.

In this state, the gantry 10 is at the +X-direction travel limit, and the movement of the gantry 10 in the +X direction is regulated by a movement regulating portion (not illustrated). Further, the carriage 16 is at the +Y-direction travel limit, and the movement of the carriage 16 in the +Y direction is regulated. As illustrated in FIG. 8, a regulating member 12 is provided at an end portion of the frame 11 forming the base of the gantry 10 in the +Y direction. When the carriage slider 15 comes into contact with the regulating member 12, movement of the carriage slider 15, that is, the carriage 16, in the +Y direction is regulated. With this configuration, when the carrying case 30 is gripped in a state in which the Y-axis direction is aligned with the vertical direction, vertically downward movement of the carriage slider 15, that is, the carriage 16, is regulated by the regulating member 12.

The home position of the carriage 16 may be any other position. Furthermore, the position of the carriage 16 when the movement regulating body 34 regulates the movement of the carriage 16 is not limited to the home position, but may be any other position. When the colorimetric scanning device 1 is housed in the carrying case 30, the movement regulating body 34 regulates the movement of the carriage 16 in the −X direction. However, the movement regulating body 34 may also regulate movement of the carriage 16 in the +X direction or bidirectional movement of the carriage 16 in the +X direction and the −X direction. Similarly, although the movement regulating body 34 regulates the movement of the carriage 16 in the −Y direction in the present embodiment, the movement regulating body 34 may also regulate movement of the carriage 16 in the +Y direction or bidirectional movement of the carriage 16 in the +Y direction and the −Y direction. Further, in the present embodiment, the movement regulating body 34 comes into contact with a side surface of the carriage 16 having a box shape, but the present disclosure is not limited thereto. For example, it is sufficient that the movement regulating body 34 can regulate the movement of the carriage 16 by engaging with a part of the carriage 16 even when the carriage 16 does not have a box shape.

Further, the carrying case 30 includes the grip portion 40 for gripping the carrying case 30 in a state in which the Y-axis direction is aligned with the vertical direction. The movement regulating body 34 has a shape that avoids the carriage 16 when the carriage 16 is positioned at a vertically downward travel limit, and specifically avoids the carriage 16 by having the notch 34*j*. As a result, when the carrying case 30 is carried by gripping the grip portion 40, the carriage 16 is positioned at the vertically downward travel limit, so that the position of the carriage 16 in the vertical direction can be easily stabilized.

Figure 7:
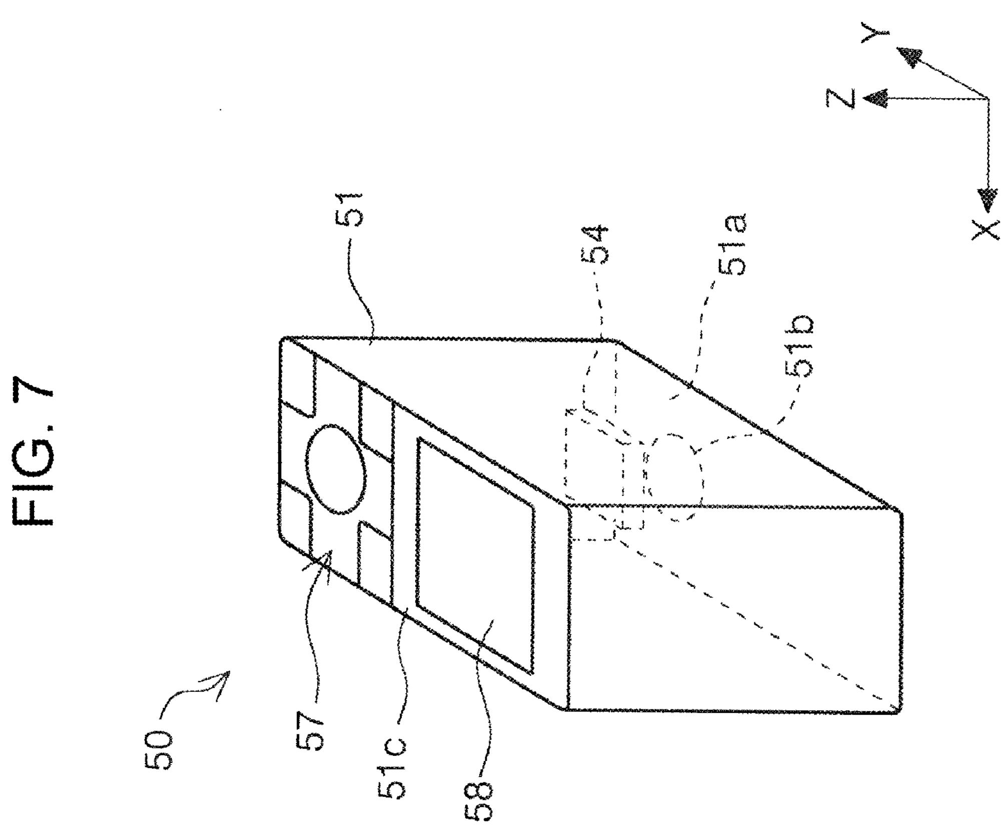
FIG. 7 is a perspective view of a colorimetric device.

Next, the colorimetric device 50 will be schematically described with reference to FIG. 7. The colorimetric device 50 is a device that performs color measurement on the color chart 19 and transmits the color measurement result to a computer (not illustrated). The colorimetric device 50 according to the present embodiment is of a hand type that can be gripped and handled by the user with one hand. The colorimetric device 50 includes a battery (not illustrated) that is a power supply source of the device and an incident light processing unit 54 that processes incident light inside a device body 51. Although a detailed description of the incident light processing unit 54 is omitted, the incident light processing unit 54 in the present embodiment includes an optical filter (not illustrated).

The optical filter selectively transmits an arbitrary wavelength component from the incident light inside the device. The light transmitted through the optical filter enters a light receiving element (not illustrated), specifically, a photodiode. An intensity of the incident light is then converted into a voltage value and output to a control unit (not illustrated). The colorimetric device 50 measures a spectrum of a color measurement target by repeatedly performing wavelength selection using the optical filter and acquisition of the intensity of the received light. In the present embodiment, the optical filter is a wavelength-tunable Fabry-Perot etalon, which is a wavelength filter that utilizes multiple interference between two facing reflective surfaces. It is a matter of course that the incident light processing unit 54 is not limited to including such an optical filter. The wavelength-tunable Fabry-Perot etalon has a configuration in which wavelength selection is performed by controlling a distance between a pair of mirrors (not illustrated) in an optical axis direction, the pair of mirrors being arranged in such a way as to face each other while being spaced apart from each other in the optical axis direction.

An opening portion 51*b* is formed in a bottom surface 51*a* of the device, and incident light from the color measurement target toward the incident light processing unit 54 is taken into the device through the opening portion 51*b*. A light emitting unit (not illustrated) is provided inside the opening portion 51*b*, and light emitted from the light emitting unit is directed to the outside of the device through the opening portion 51*b* and is radiated to the color measurement target facing the bottom surface 51*a*. An operation unit 57 for performing various operations and a display unit 58 that displays various types of information are provided on a top surface 51*c* of the device body 51. The colorimetric device 50 configured as described above is housed in the carriage 16 of the colorimetric scanning device 1. The carriage 16 is formed in a size and shape that can house the colorimetric device 50.

Figure 9:
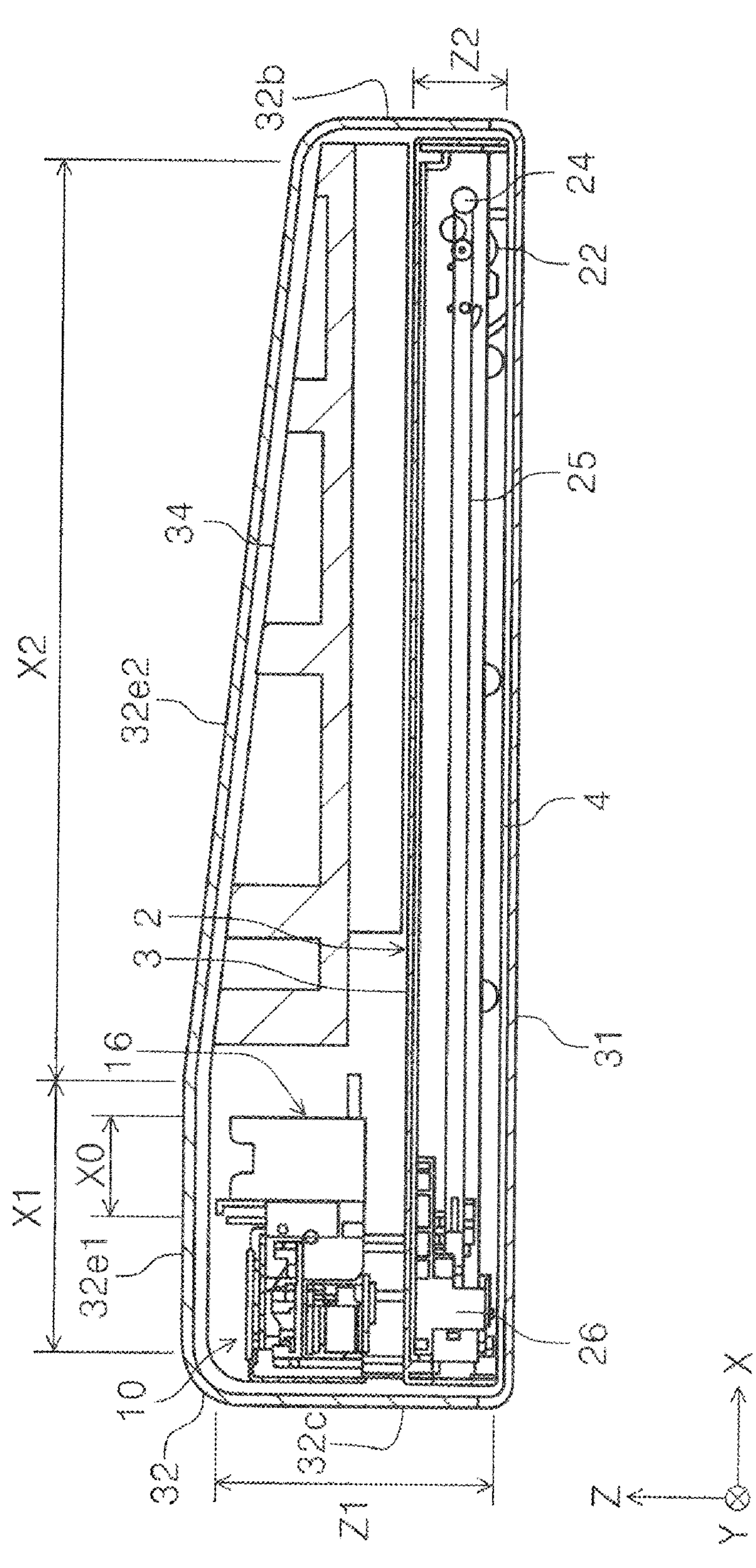
FIG. 9 is a cross-sectional view of a colorimetric scanning device and the carrying case.

Next, a shape of the lid portion 32 will be described in detail. In FIGS. 1 and 9, as described above, the surface of the lid portion 32 has the first region 32*e*1 parallel to the X-Y plane, and the second region 32*e*2 that is inclined downward from the first region 32*e*1 in the −X direction. The first region 32*e*1 covers the thickest portion of the colorimetric scanning device 1. In the present embodiment, the thickest portion of the colorimetric scanning device 1 is the carriage 16. In FIG. 9, Symbol Z1 denotes a dimension of the colorimetric scanning device 1 in the Z-axis direction at a portion including the carriage 16, that is, a thickness of the colorimetric scanning device 1. The thickness Z1 is a thickness when the carriage 16 is at the above-described installation position. Symbol X0 denotes a dimension of the carriage 16 in the X-axis direction. The second region 32*e*2 descends from the first region 32*e*1 toward a portion thinner than the thickest portion of the colorimetric scanning device 1. Symbol Z2 denotes a dimension of the colorimetric scanning device 1 including the scanning stage 2 in the Z-axis direction, that is, a thickness of the colorimetric scanning device 1. The thickness Z2 is smaller than the thickness Z1. Note that Symbol X1 denotes a dimension of the first region 32*e*1 in the X-axis direction, and Symbol X2 denotes a dimension of the second region 32*e*2 in the X-axis direction.

In this way, the lid portion 32 has the first region 32*e*1 that covers the carriage 16, which is the thickest portion of the colorimetric scanning device 1, and the second region 32*e*2 that extends downward from the first region 32*e*1 toward a portion thinner than the thickest portion. As the inclined second region 32*e*2 is provided, it is possible to suppress other articles from being placed on the carrying case 30 that is in a laid-down position or to suppress a plurality of carrying cases 30 from being stacked. As a result, it is possible to suppress damage or failure caused by an excessive load applied to the colorimetric scanning device 1 inside the carrying case 30.

In particular, in a case where the thickest portion of the colorimetric scanning device 1 is the carriage 16 that is movable in the Y-axis direction and the X-axis direction with respect to the scanning stage 2, the carriage 16 easily fails when an external load is applied to the carriage 16. However, the failure of the carriage 16 can be suppressed due to the effects of the second region 32*e*2 described above. In addition, the second region 32*e*2 of the lid portion 32 can suppress the carriage 16, that is, the gantry 10, from significantly moving in the −X direction within the carrying case 30 even when the movement regulating body 34 is not provided. Also from this point of view, the second region 32*e*2 can suppress the failure of the carriage 16.

Further, the carriage 16 is provided on the gantry 10 that has a shape extending in the Y-axis direction and is movable in the X-axis direction, and the first region 32*e*1 extends in the Y-axis direction in such a way as to cover an upper portion of the gantry 10. Thereby, the entire gantry 10 can be protected by the first region 32*e*1.

The first region 32*e*1 is positioned at an end portion of the lid portion 32 in the +X direction, and the second region 32*e*2 extends linearly downward from the first region 32*e*1 to an end portion of the lid portion 32 in the −X direction. With this configuration, the second region 32*e*2 for suppressing other articles from being placed on the carrying case 30 that is in a laid-down position or suppressing a plurality of carrying cases 30 from being stacked has a large size. As a result, it is possible to effectively suppress other articles from being placed on the carrying case 30 that is in a laid-down position or suppress a plurality of carrying cases 30 from being stacked. Although the second region 32_e_2 is a planar surface in the present embodiment, the second region 32_e_2 may be a recessed surface or a protruding surface.

Figure 10:
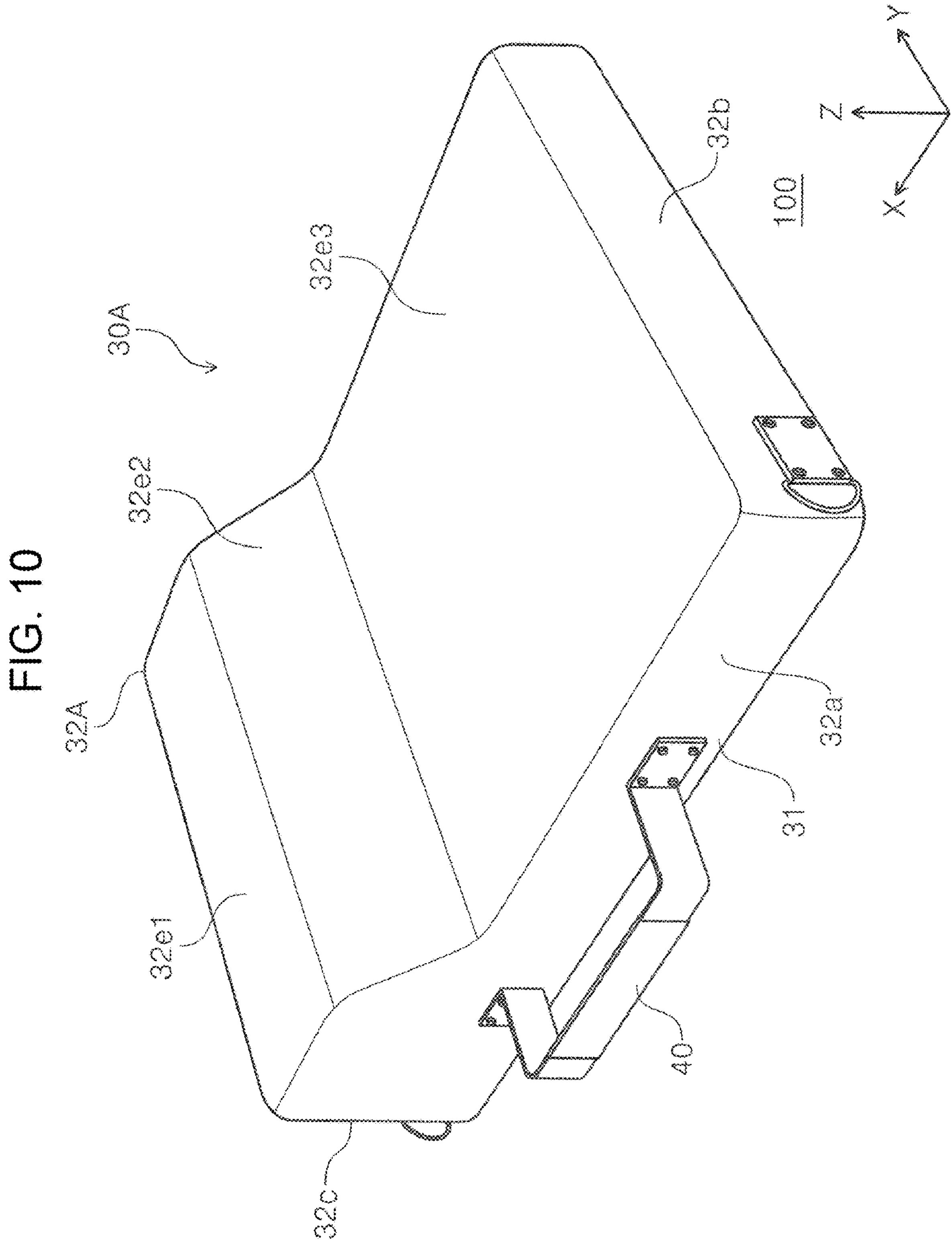
FIG. 10 is a perspective view of a carrying case according to another embodiment, viewed from the front.
Figure 11:
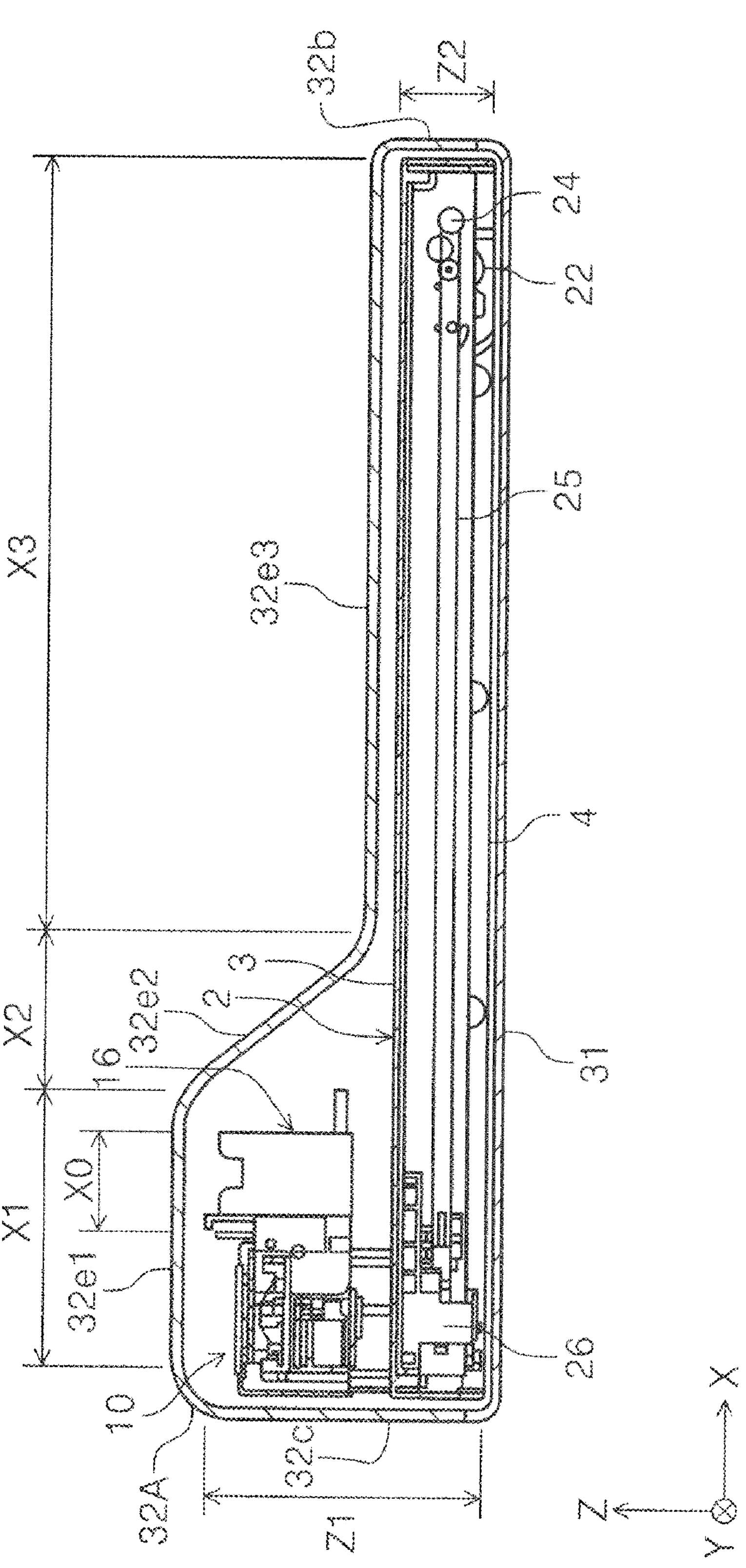
FIG. 11 is a cross-sectional view of a colorimetric scanning device and the carrying case according to another embodiment.

In the above-described embodiment, the second region 32_e_2 extends linearly downward from the first region 32_e_1 to the end portion of the lid portion 32 in the −X direction. However, the second region 32_e_2 may end midway as in a lid portion 32A illustrated in FIGS. 10 and 11. In the present embodiment, the lid portion 32A has a third region 32_e_3 parallel to the scanning stage 2 at an end portion of the lid portion 32A in the −X direction. The second region 32_e_2 is positioned between the first region 32_e_1 and the third region in the X-axis direction. Symbol X3 denotes a dimension of the third region 32_e_3 in the X-axis direction. With such a configuration, it is possible to downsize a carrying case 30A.

Other features of the carrying case 30 according to the present embodiment will be described below. The carrying case 30 includes the fastener 37 that couples the case body 31 and the lid portion 32. The fastener 37 is provided at a position lower than the stage surface 2_a_ of the scanning stage 2 in the vertical direction when the case body 31 is mounted on the device mounting surface 100. Thereby, the fastener 37 is less likely to interfere with the color measurement target when placing the color measurement target on the stage surface 2_a_ of the scanning stage 2.

Figure 13:
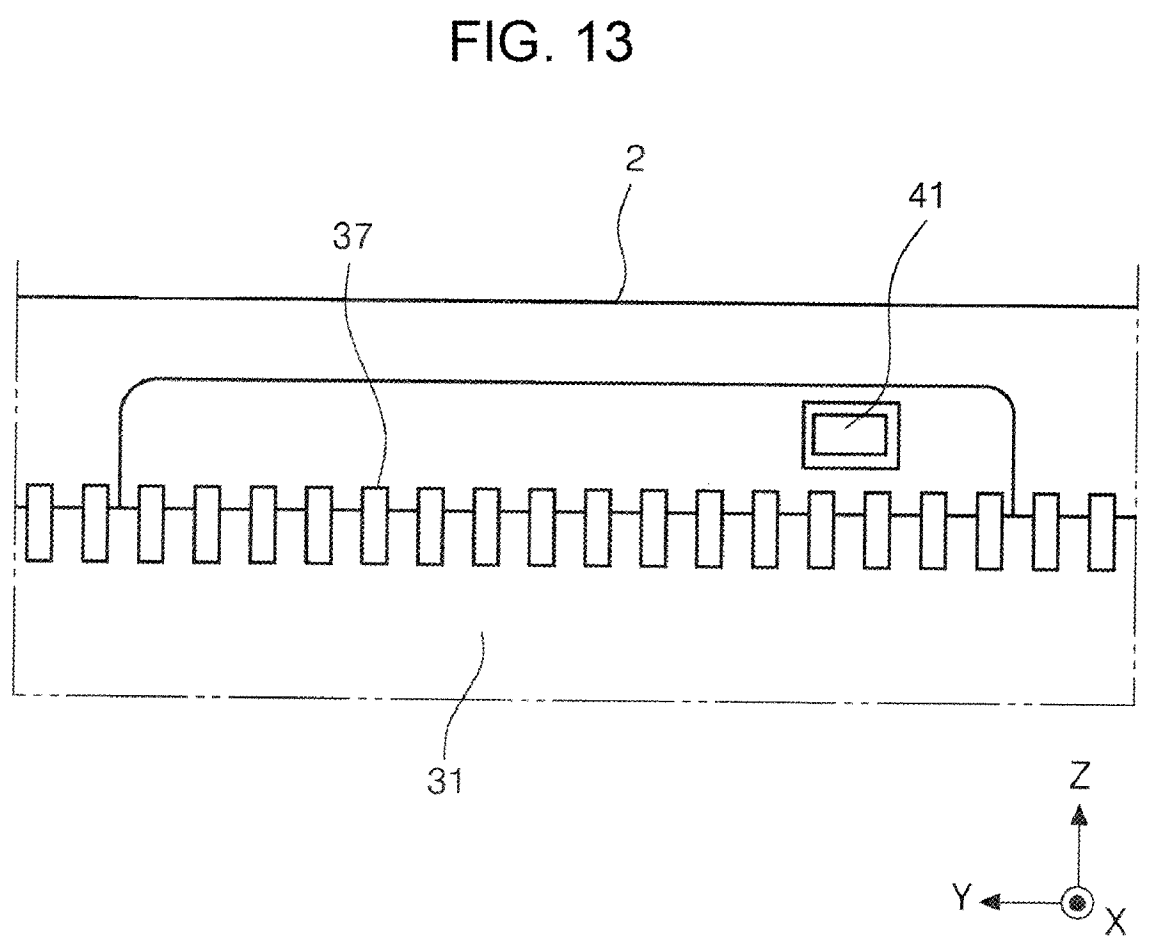

As illustrated in FIG. 13, the fastener 37 is provided at a position that does not cover a connector coupling portion 41 provided on a side surface of the colorimetric scanning device 1. In the present embodiment, the connector coupling portion 41 is provided on a side surface of the scanning stage 2 in the +X direction. Since the fastener 37 does not cover the connector coupling portion 41, interference between the fastener 37 and a connector (not illustrated) coupled to the connector coupling portion 41 or a cable (not illustrated) to which the connector is attached can be suppressed.

Figure 12:
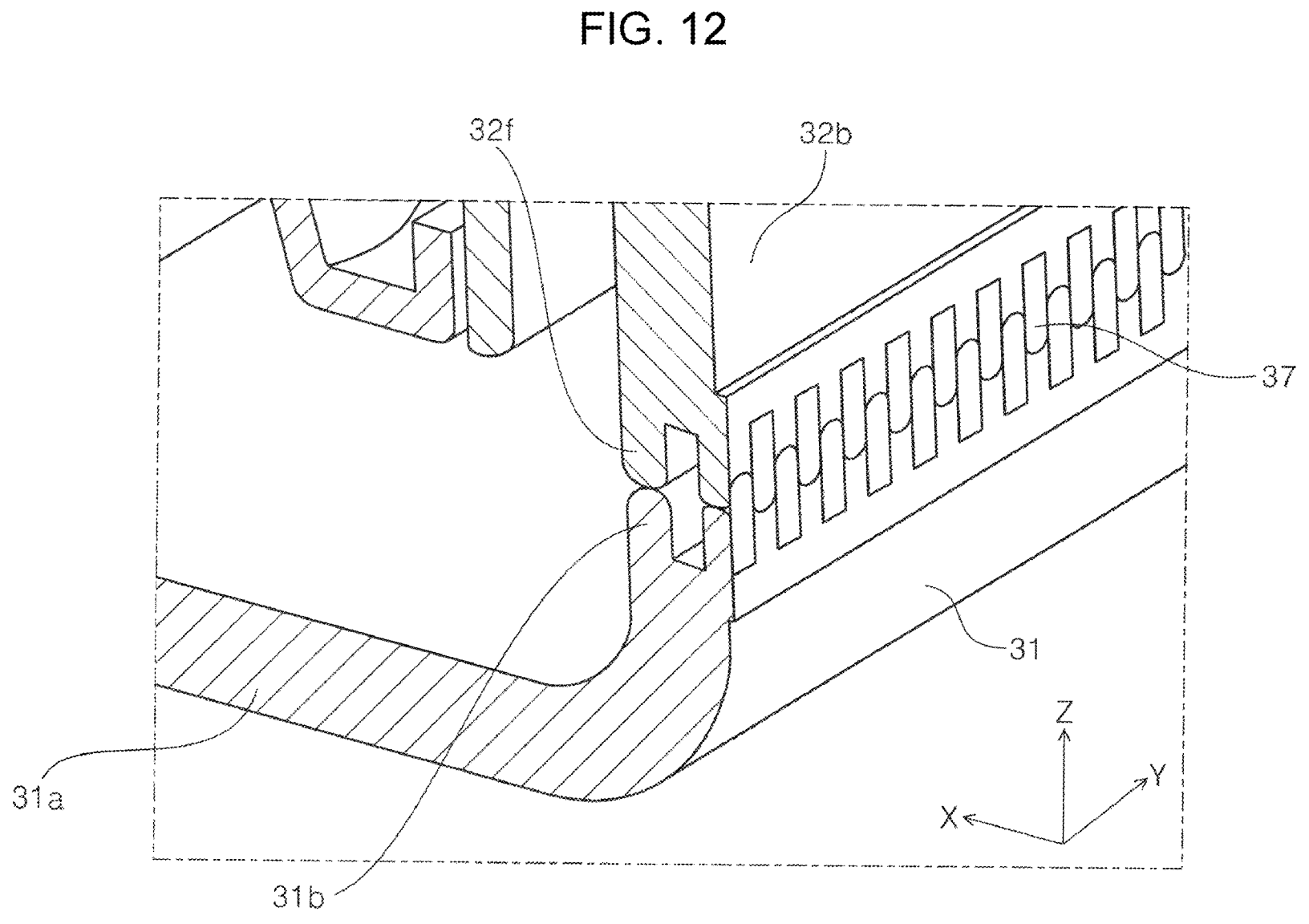

As illustrated in FIG. 12, the case body 31 has an inner edge portion 31_b_ positioned more inward than the fastener 37, and similarly, the lid portion 32 has an inner edge portion 32_f_ positioned more inward than the fastener 37. When the case body 31 and the lid portion 32 are coupled by the fastener 37, the inner edge portion 31_b_ of the case body 31 and the inner edge portion 32_f_ of the lid portion 32 are brought into close contact with each other. As a result, it is possible to suppress water from entering inside through the fastener 37.

It goes without saying that the present disclosure is not limited to the embodiments described above, that a variety of modifications is possible within the scope of the present disclosure described in the claims, and that the modifications also fall within the scope of the present disclosure.

What is claimed is:

1. A carrying case configured to house a colorimetric scanning device that scans a color measurement target placed on a scanning stage on which a colorimetric device is mounted, the carrying case comprising:

a case body that faces a bottom portion of the colorimetric scanning device; and a lid portion that is coupled to the case body and configured to be switched between a state of covering the colorimetric scanning device and an open state, wherein the lid portion has a first region and a second region, the first region covers a thickest portion of the colorimetric scanning device, the second region extends downward from the first region toward a portion thinner than the thickest portion, the thickest portion of the colorimetric scanning device is a scanning portion configured to move with respect to the scanning stage in a first direction and a second direction intersecting the first direction, and the first region of the lid portion covers the scanning portion.

2. The carrying case according to claim 1, wherein the scanning portion is provided on a gantry that has a shape extending in the first direction and is configured to move in the second direction, and the first region extends in the first direction in such a way as to cover an upper portion of the gantry.

3. The carrying case according to claim 2, wherein the first region is positioned at one end portion of the lid portion in the second direction, and the second region extends linearly downward from the first region to another end portion of the lid portion in the second direction.

4. The carrying case according to claim 2, wherein the first region is positioned at one end portion of the lid portion in the second direction, the lid portion has a third region that is parallel to the scanning stage and is positioned at another end portion of the lid portion in the second direction, and the second region is positioned between the first region and the third region in the second direction.

5. The carrying case according to claim 1, further comprising a grip portion configured to grip the carrying case in a state in which the first direction is aligned with a vertical direction, wherein the grip portion is provided on one side surface of the lid portion in the first direction among side surfaces forming a periphery of the lid portion.

6. The carrying case according to claim 1, further comprising a movement regulating body configured to regulate movement of the scanning portion in at least one of the first direction or the second direction in a state in which the colorimetric scanning device is housed in the carrying case, wherein the movement regulating body is disposed in such a way as to utilize a movement region of the scanning portion.

7. The carrying case according to claim 6, further comprising a grip portion configured to grip the carrying case in a state in which the first direction is aligned with a vertical direction, wherein the movement regulating body has a shape that avoids the scanning portion in a state in which the scanning portion is positioned at a vertically downward travel limit when the grip portion is gripped.

8. The carrying case according to claim 6, wherein the movement regulating body includes a recessed portion configured to house an article.

9. The carrying case according to claim 1, wherein the lid portion is attachable to and detachable from the case body.

10. The carrying case according to claim 1, further comprising a fastener configured to couple the case body and the lid portion, wherein the fastener is provided at a position lower than a stage surface of the scanning stage in a vertical direction when the case body is mounted on a mounting surface.

11. The carrying case according to claim 1, further comprising a fastener configured to couple the case body and the lid portion, wherein the fastener is provided at a position that does not cover a connector coupling portion provided on a side surface of the colorimetric scanning device.

12. The carrying case according to claim 1, further comprising a fastener configured to couple the case body and the lid portion, wherein the fastener is provided at a position that does not cover a connector coupling portion provided on a side surface of the colorimetric scanning device.

13. A carrying case configured to house a colorimetric scanning device that scans a color measurement target placed on a scanning stage on which a colorimetric device is mounted, the carrying case comprising:

a case body that faces a bottom portion of the colorimetric scanning device; and a lid portion that is coupled to the case body and configured to be switched between a state of covering the colorimetric scanning device and an open state, wherein the lid portion has a first region and a second region, the first region covers a thickest portion of the colorimetric scanning device, the second region extends downward from the first region toward a portion thinner than the thickest portion, and the lid portion is attachable to and detachable from the case body.

14. The carrying case according to claim 13, wherein the thickest portion of the colorimetric scanning device is a scanning portion configured to move with respect to the scanning stage in a first direction and a second direction intersecting the first direction, the first region of the lid portion covers the scanning portion, the scanning portion is provided on a gantry that has a shape extending in the first direction and is configured to move in the second direction, and the first region extends in the first direction in such a way as to cover an upper portion of the gantry.

15. The carrying case according to claim 14, wherein the first region is positioned at one end portion of the lid portion in the second direction, and the second region extends linearly downward from the first region to another end portion of the lid portion in the second direction.

16. The carrying case according to claim 14, wherein the first region is positioned at one end portion of the lid portion in the second direction, the lid portion has a third region that is parallel to the scanning stage and is positioned at another end portion of the lid portion in the second direction, and the second region is positioned between the first region and the third region in the second direction.

17. The carrying case according to claim 13, further comprising a grip portion, wherein the thickest portion of the colorimetric scanning device is a scanning portion configured to move with respect to the scanning stage in a first direction and a second direction intersecting the first direction, the first region of the lid portion covers the scanning portion, the grip portion is configured to grip the carrying case in a state in which the first direction is aligned with a vertical direction, and the grip portion is provided on one side surface of the lid portion in the first direction among side surfaces forming a periphery of the lid portion.

18. The carrying case according to claim 13, further comprising a movement regulating body, wherein the thickest portion of the colorimetric scanning device is a scanning portion configured to move with respect to the scanning stage in a first direction and a second direction intersecting the first direction, the first region of the lid portion covers the scanning portion, the movement regulating body is configured to regulate movement of the scanning portion in at least one of the first direction or the second direction in a state in which the colorimetric scanning device is housed in the carrying case, and the movement regulating body is disposed in such a way as to utilize a movement region of the scanning portion.

19. The carrying case according to claim 18, further comprising a grip portion configured to grip the carrying case in a state in which the first direction is aligned with a vertical direction, wherein the movement regulating body has a shape that avoids the scanning portion in a state in which the scanning portion is positioned at a vertically downward travel limit when the grip portion is gripped.

20. The carrying case according to claim 13, further comprising a fastener configured to couple the case body and the lid portion, wherein the fastener is provided at a position lower than a stage surface of the scanning stage in a vertical direction when the case body is mounted on a mounting surface.

* * * * *